United States Patent
Watanabe

[11] 3,785,266
[45] Jan. 15, 1974

[54] SINGLE LENS REFLEX CAMERA CAPABLE OF OPEN APERTURE PHOTOMETRY AND APERTURE STOP PHOTOMETRY

[75] Inventor: Yoshiaki Watanabe, Tokyo, Japan

[73] Assignee: Canon Kabushiki Kaisha, Tokyo, Japan

[22] Filed: Nov. 1, 1971

[21] Appl. No.: 194,410

[30] Foreign Application Priority Data
Nov. 5, 1970  Japan .............................. 45/97330

[52] U.S. Cl. ................. 95/64 R, 95/10 C, 95/64 B
[51] Int. Cl. ............................................. G03b 9/07
[58] Field of Search .................... 95/10 C, 42, 64 R, 95/64 A, 64 B

[56] References Cited
UNITED STATES PATENTS

| | | |
|---|---|---|
| 3,097,581 | 7/1963 | Kremp et al. ...................... 95/10 C |
| 3,394,644 | 6/1968 | Ettischer ............................ 95/64 R |
| 3,589,252 | 6/1971 | Hahn ................................. 95/42 X |
| 3,613,536 | 10/1971 | Taguchi ............................ 95/10 C |
| 3,603,234 | 9/1971 | Strehle .................................. 95/42 |

Primary Examiner—Samuel S. Matthews
Assistant Examiner—E. M. Bero
Attorney—Joel Halpern

[57] ABSTRACT

A single lens reflex camera, on which can be mounted both types of interchangeable lenses for open aperture and aperture stop photometry, is provided with a mechanism. This mechanism enables to operate open aperture photometry or aperture stop photometry selectively, even when an interchangeable lens for open aperture photometry is mounted on a camera.

7 Claims, 9 Drawing Figures

A SINGLE LENS REFLEX CAMERA CAPABLE OF OPEN APERTURE PHOTOMETRY AND APERTURE STOP PHOTOMETRY

BACKGROUND OF THE INVENTION

The present invention relates to an exposure determination system for single lens reflex cameras, and more particularly to an exposure determination system for single lens reflex cameras capable selectively of either open aperture photometry or aperture stop photometry.

The expression "open aperture photometry" refers to measurement of the light intensity of the subject being photographed with the aperture provided for an interchangeable lens device fully open. This system of measurement is preferred in a single lens reflex camera in which the optical path for the view finder is arranged through the objective lens, since measurement of the light intensity may then be effected at the same time as the subject is being observed with the aperture fully open. This is in direct contrast to "aperture stop photometry" explained below. The "open aperture photometry" system is disclosed in U. S. Pat. Nos. 3,094,053; 3,427,946 and 3,603,234.

The expression "aperture stop photometry" refers to measurement of the light intensity of the subject being photographed with the aperture provided for an interchangeable lens device stopped down to that stop value at which the photograph is to be taken. Thus, the intensity of the light striking the light-receiving cell disposed across the path of the light through the lens is equal to the intensity of the light which strikes the film when the photograph is taken. This system of measurement is disclosed in DAS 1,208,186.

The expression "zero method photometry" refers to the obtaining of an optimum exposure value by the setting of the indicator of a meter at a fixed index position, U. S. Pat. No. 3,094,053, mentioned above, discloses this technique as well as "open aperture photometry."

The so-called TTL system, in which the light passing through a lens system toward a film plane is measured, may be advantageously employed in measuring the brightness of a subject being photographed with a higher degree of accuracy. The TTL system is generally utilized with aperture stop photometry, in which the brightness of a subject is measured at a stop to be used, and with open aperture photometry, in which the brightness of a subject is measured at the maximum stop of the lens system used. The interchangeable lenses for use with single lens reflex cameras having difficult F numbers, maximum aperture ratios and so on are also generally grouped into those for use in open aperture photometry and those for use in aperture stop photometry. Even though there have been available a wide variety of interchangeable lenses, there have been available only two types of single lens reflex cameras, one type being capable of only open aperture photometry with the interchangeable lenses designed especially for open aperture photometry and the other type being capable of only aperture stop photometry with the interchangeable lenses designed exclusevely for use with aperture stop photometry. In other words, there has not been available heretofore a single lens reflex camera capable of mounting either type of the interchangeable lenses selectively for open aperture photometry or aperture stop photometry.

Although open aperture photometry and aperture stop photometry have their own merits and demerits, respectively, it is impossible for present single lens reflex cameras, capable of mounting only one type of interchangeable lenses, i.e., for open aperture photometry or aperture stop photometry, to increase the range of photographing by taking full advantage of the open aperture and the aperture stop photometries integrally.

One of the objects of the present invention is, therefore, to provide an exposure determination system for use with single lens reflex cameras capable of both open aperture photometry and aperture stop photometry selectively as desired, thus overcoming the defects encountered in the prior art cameras.

Another object of the present invention is to provide an exposure determination device for use with single lens reflex cameras which incorporates an automatic aperture control device capable of setting the aperture blades to the optimum aperture irrespective of the type of interchangeable lenses mounted in the camera, i.e., for open aperture photometry or aperture stop photometry.

Another object of the present invention is to provide an exposure determination system for use with single lens reflex cameras which incorporates a built-in exposure meter whose pointer swings through an angle in response to the brightness of a subject and a matching indicator which may be utilized both in open aperture photometry and aperture stop photometry, but in different methods.

According to the present invention, in a camera body is disposed a movable member which releasably engages with an aperture preset member in an interchangeable lens system for open aperture photometry and a first matching pointer which is aligned with the pointer of the exposure meter, which swings depending upon the brightness of a subject, to determine the optimum exposure by the open aperture photometry. Furthermore a second matching member is provided relative to the pointer of the exposure meter so that the pointer may be aligned with the second matching member when an interchangeable lens for aperture stop photometry is mounted, while means being provided for displacing said first matching member away from the operative range of the meter, thereby determining the optimum exposure by means of the aperture stop photometry.

The above and other objects, features and advantages of the present invention will become more apparent from the following description of the preferred embodiments thereof taken in conjunction with the accompanying drawing.

DESCRIPTION OF THE PREFERRED EMBODIMENT

Figure 1:
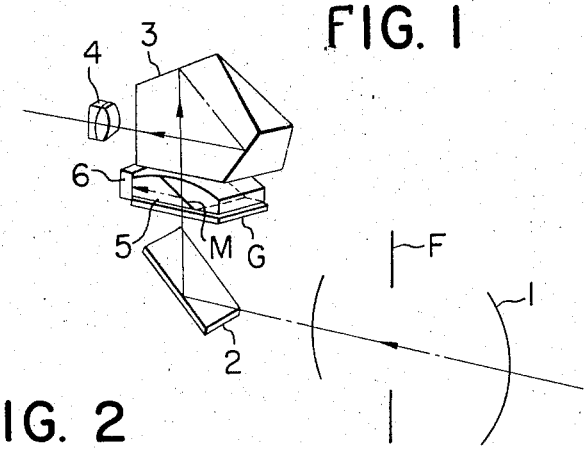
FIG. 1 is a diagram illustrating a photometry optical system of a single lens reflex camera to which is applied the present invention.

Referring to FIG. 1 illustrating the optical system of a viewfinder of a single lens reflex camera incorporating the prior art TTL photometry optical system, reference numeral 1 designates an interchangeable camera lens system; F, aperture diaphragms interposed in this lens system; 2, a reflecting mirror; 3, a penta prism; 4, an eyepiece; 5, a condenser lens; 6, a photoelectric effect element for photometry such as CdS, disposed on one side surface of the condenser lens 5; and G, a ground glass, disposed on the undersurface of the condenser lens 5. The condenser lens 5 is divided into two elements along the interface inclined at 45°, as clearly illustrated in FIG. 1 and a thin metal film is deposited upon the interface of one element, thereby forming a half mirror M.

In the viewfinder optical system described above, light from a subject incident on the lens system 1 is totally reflected by the mirror 2 to focus the image of the subject on the ground glass G, and thereafter is transmitted through the half mirror M to be intercepted by the photoelectric effect element 6 whereby the quantity of light from the subject is detected. Simultaneously, the image focused upon the ground glass is viewed through the eyepiece 4.

The electrical output from the element 6 is applied to an exposure meter circuit (not shown) so that the optimum exposure may be indicated by the swing of the pointer of the exposure meter.

Figure 4:
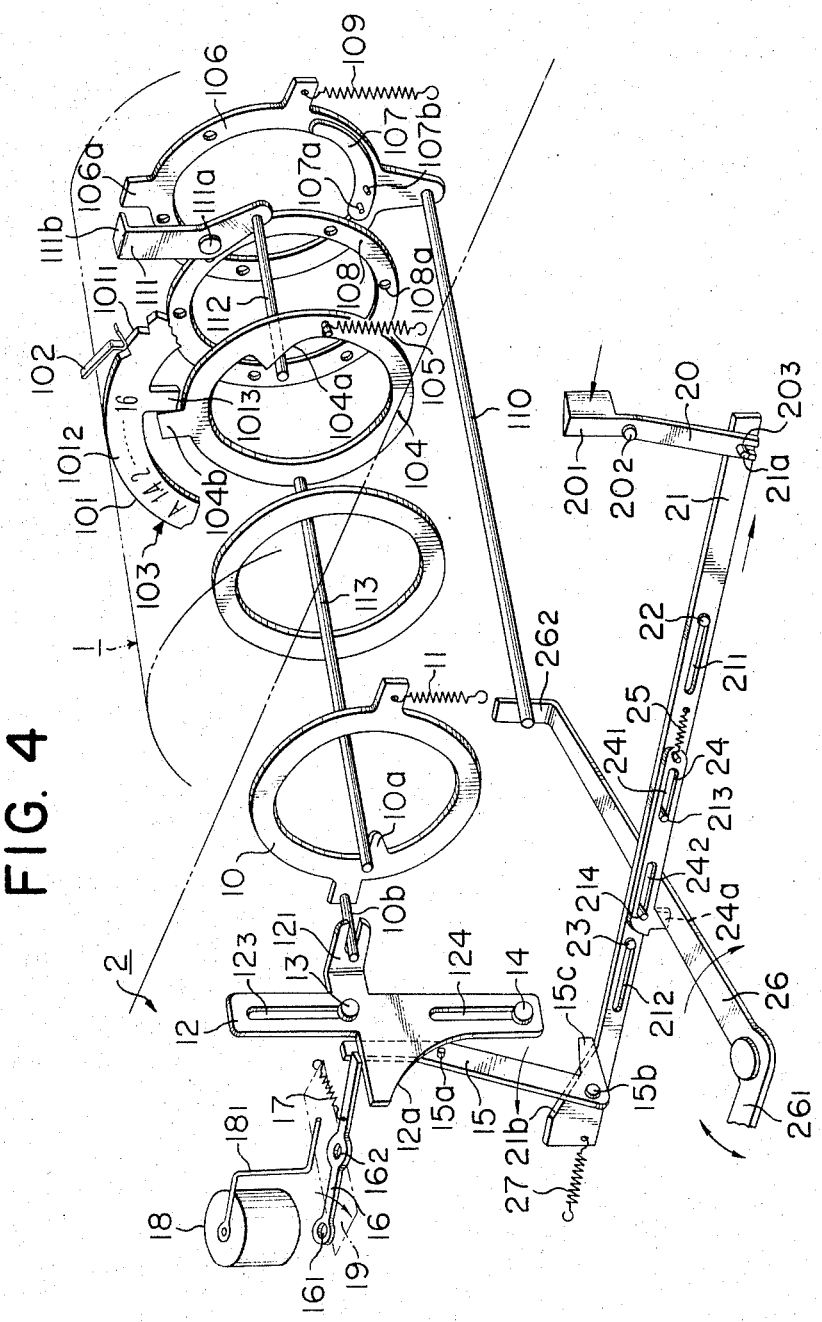
FIG. 4 is a schematic perspective view illustrating an exposure determination system constructed in accordance with the concept of the present invention together with an interchangeable lens system for open aperture photometry.

Referring to FIG. 4 illustrating the arrangement of an exposure determination system which is constructed in accordance with the concept of the present invention to be applied to the photometry system shown in FIG. 1, reference numeral 2 designates a camera body mounting an interchangeable lens 1 adapted for open aperture photometry.

In the camera body 2, an engaging ring 10, which engages with a signal transmitting member for an aperture cam on the side of the lens system to be described in more detail hereinafter, is provided with a projection 10a projecting radially inwardly from the inner periphery of the engaging ring 10 and a pin 10b extending from the outer periphery of the ring 10 in parallel with the optical axis of the lens system. The engaging ring 10 is biased to rotate in the counter-clockwise direction, viewed from the lens system 1, under the force of a spring 11, and is disposed for rotation about the optical axis of the lens system 1 which is mounted by suitable mounting means (not shown) in coaxial relation with the engaging ring 10. A cam member 12 has its elongated slots $12_3$ and $12_4$ adapted to receive guide pins 13 and 14 which are mounted in a stationary frame (not shown) in the camera body 2 so that the cam member may slide with respect to the frame under the influence of pin 10b as will be later described. The cam member is provided with a bifurcated projection $12_1$ and a cam surface 12a, which is adapted to engage with a pin 15a carried by an intermediate lever 15 pivotable around a pin 15b which is fixed to the stationary frame (not shown) of the camera body 2. One end of a matching indicator which is preferably pointer 16 is pivotable around $16_1$, and is biased under the force of a spring 17 to normally engage with the upper end of the intermediate lever 15. The matching pointer 16 is provided with an indicating portion $16_2$ at the center thereof. A pointer $18_1$ of an exposure meter 18 is bent in the form of an "L" as clearly shown in FIG. 4 and is pivotable substantially coaxially of the pivot $16_1$ so that the matching pointer member 16 may swing within the same range as that of the pointer $18_1$.

A scale 19 is focused in the field of view of the viewfinder in order to indicate the range through which the pointer $18_1$ swings, the scale 19 being projected by use of an optical system such as disclosed, for example, by US Pat. No. 3,128,684. For a detailed description of such an optical system, reference may be made to said patent. On both ends of the scale 19 are formed mask portions 19a, made of an opaque material there being also provided a notch 19c at one of the mask portions 19a which is used as an index in the aperture stop photometry technique as will be described in more detail hereinafter. A stop aperture photometry lever 20 is pivoted around pin $20_2$ fixed to the stationary member in the camera body 2, and has its one arm $20_1$ extended beyond the camera body so that this lever may be actuated from the exterior thereof. The other end of the lever 20 is bifurcated as indicated by $20_3$ to receive, therein, a pin 21a extending from one end of a sliding arm 21. Elongated guide slots $21_1$ and $21_2$ of the sliding arm 21 are adapted to receive guide pins 22 and 23 respectively, extending from the stationary frame of the camera body so that arm 21 may slide relative to said frame. The sliding arm 21 is provided with a pair of guide pins $21_3$ and $21_4$ which are fitted into elongated guide slots $24_1$ and $24_2$ of a retarding member 24 so that the latter may slide upon the sliding arm 21. The retarding member 24 is loaded with a spring 25, and has a projection 24a which extends downwardly from one end thereof for engagement with one arm of an aperture setting lever 26. A cam surface 21b is formed at the other end of the sliding arm 21, the arm being biased under the force of a return spring 27 to return to its normal position so that the lower end 15c of the intermediate lever 15 may be maintained in contact with the cam surface 21b also under the force of the spring 17.

The automatic aperture setting lever 26 is pivotally mounted around a pin 26a for rotation thereabout in the directions indicated by the double-pointed arrow in FIG. 4 and is operatively coupled to a mechanism (not shown) for reciprocating the mirror 2, the mechanism being any of the suitable prior art mechanisms so that it is not shown in the figure for simplicity.

The interchangeable lens system 1, illustrated in FIG. 4, is for open aperture photometry and comprises a preset ring 101 provided with click stop notches $101_1$ and a click stop plate spring 102. Both of notches $101_1$ and spring 102 are shown as being arranged along the outer periphery of the preset ring 101 for simplicity, but can be disposed within the preset ring 101 in practice as a unitary construction therewith. Apertures or stops such as A, 1.4, 2 and so on generally indicated by $101_2$ are marked on the preset ring 101, and the mark A is a set mark used when the automatic exposure determination device in accordance with the present invention is incorporated into the camera as will be described in more detail hereinafter. An index mark 103 is marked on the lens body or barrel in opposed relation with the aperture or stop marks $101_2$. The interchangeable lens system 1 further comprises a cam ring 104 which is biased to rotate in the clockwise direction, viewed from the left end of the lens system, under the force of a spring 105. A cam portion 104a is formed at one portion of the inner periphery of the cam ring 104 and a projection 104b extends from the outer periphery of the cam ring 104 adapted to engage with a projection $101_3$ protruding inwardly from the preset ring 101. The lens system 1 further comprises an aperture diaphragm control ring 106 having a plurality of aperture diaphragms provided pivotally thereon. For example one pin 107a of each of the aperture diaphragms, or blades 107 is fitted into a transverse hole of the control ring 106 while the other pin 107b carried on the aperture blade 107 is fitted into the respective transverse hole 108 a provided on the surface of a stationary ring 108. The aperture diaphragm control ring 106 is biased to rotate in the clockwise direction, viewed from the left end of the lens system under the force of a spring 109 so that the aperture blades 107 are normally maintained at the maximum aperture or full opened aperture. An aperture setting lever 110 extends from the aperture diaphragm control ring 106 backwardly beyond the rear end of the lens system 1 so that, when the latter is mounted on the camera body, the lever 110 may engage with the automatic aperture control lever 26. A rocker 111 is pivotally mounted about a pin 111a which is fixed to the lens body or barrel in such a manner that a bent upper end 11b may engage with the projection 106a of the control ring 106. A detecting pin 112, extending from the other end of the rocker 111 in parallel with the optical axis of the lens system 1, is adapted to engage with the cam portion 104a of the cam ring 104. A set bar 113 extends backwardly in parallel with the optical axis of the lens system 1 from the cam ring 104 beyond the rear end of the lens system so that when the latter is mounted on the camera body, the set bar 113 may engage with the projection 10a of the intermediate ring 10.

Figure 2:
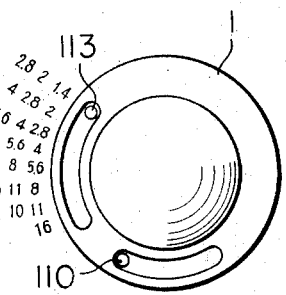
FIG. 2 is an end view of an interchangeable lens for open aperture photometry.

The construction of the rear end of the lens system 1, described above, may be viewed as shown in FIG. 2 when dismounted from the camera body. It should be noted that both of the bars 110 and 113 are so disposed as to rotate about the optical axis through the limited angles, respectively. When the bar 110 is in the position shown in FIG. 2, the aperture blades are maintained at the maximum stop or full opened aperture. It should be noted that the position of the bar 110 remains always at the same position, as clearly indicated in FIG. 2, at each of the maximum stops such as F=1.4, 2 or 2.8 of the various interchangeable lens systems when mounted. This arrangement of the present invention is especially advantageous in that the necessity for electrical and/or mechanical corrections of the exposure meter 18 may be eliminated when the equi-distant or equi-angular aperture diaphragm system, in which an aperture set is in linear proportion to the angle of rotation of the ring 106 and an equi-distant or angular exposure in which the scales are equi-distantly or equi-angularly graduated, are used.

Figure 3:
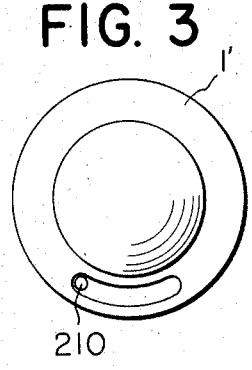
FIG. 3 is an end view of an interchangeable lens for aperture stop photometry.
Figure 5:
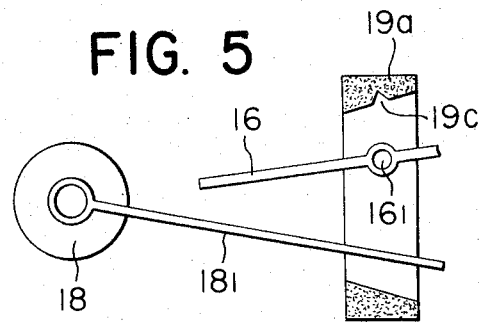
FIG. 5 is a schematic view illustrating a pointer of an exposure meter, a fixed-point or matching pointer, and the range through which the pointer and the fixed-point member swing, as viewed in the field of view of a viewfinder.
Figure 6:
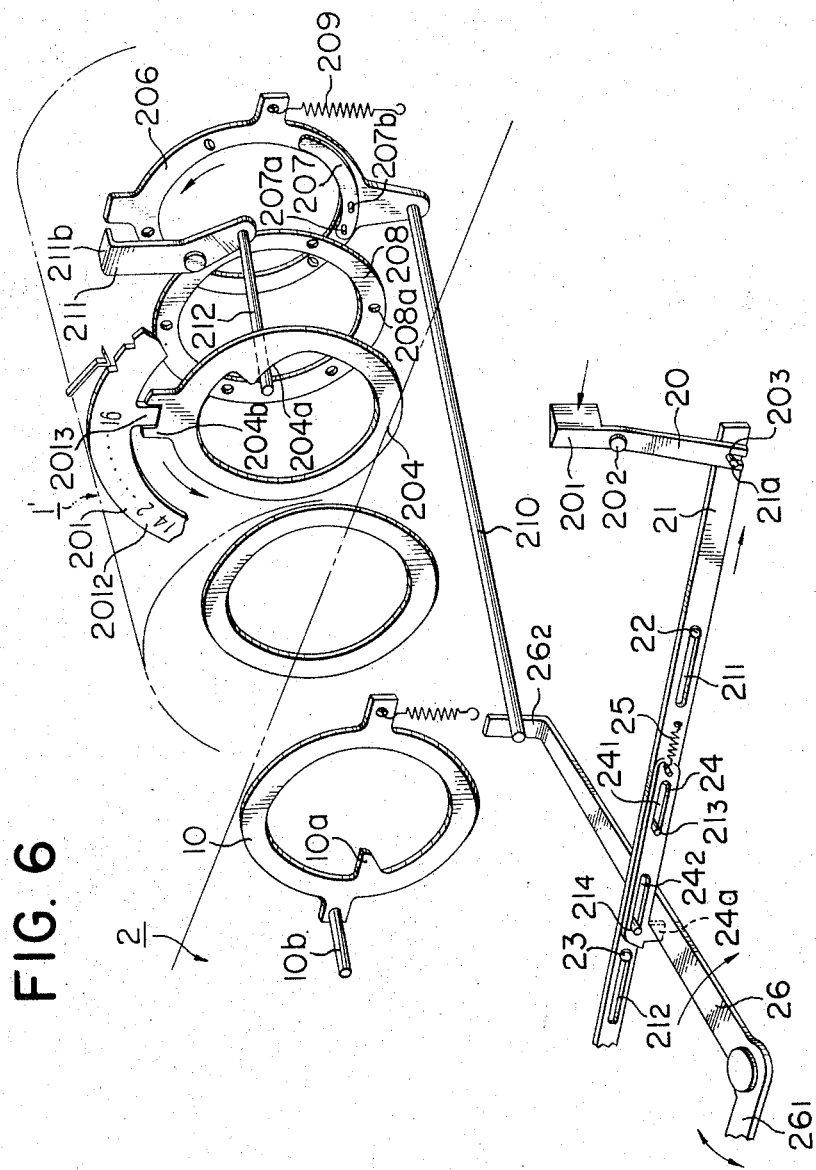
FIG. 6 is a schematic perspective view of an interchangeable lens system for aperture stop photometry which may be used with the exposure determination system of the present invention.

Next, referring to FIG. 6 illustrating an interchangeable lens system generally indicated by 1' for aperture stop photometry, parts corresponding to those of the lens system 1 shown in FIG. 4, are shown by the reference numeral used in FIG. 4 plus 100. That is, the corresponding parts are indicated by reference numerals of the order of 200s. For example, the aperture diaphragm control ring which is shown by 106 in FIG. 4 will be shown by 206 in FIG. 6. It should be noted that only one bar 210 for aperture setting extends from the rear end of the lens system 1', as shown in FIG. 3, and that other arrangements are substantially similar to those of the lens system 1, shown in FIG. 4, so that no further description will be made.

Next, the modes of operation will be described when the lenses for open aperture and aperture stop photometry respectively are mounted in the camera.

I. Open Aperture Photometry With the Lens System 1

The lens system for open aperture photometry is mounted on the camera body 2, and the exposure factors, such as the film sensitivity and the shutter speed, are fed mechanically or electrically into the exposure meter 18 in the manner well known in the art so that no description will be made. When the lens is directed toward a subject being photographed without the lever 20 being operated, the pointer $18_1$ of the exposure meter 18 swings through an angle in response to the output from the photoelectric effect element 6 in the optical system shown in FIG. 1, the deflection of the pointer $18_1$ being indicated in the field of view of the viewfinder as described above and being in proportion to the brightness of the subject. Next, when the preset ring 101 is rotated, the cam ring 104 is also caused to rotate because the projection 104b of the cam ring is normally in engagement with the projection $101_3$ of the preset ring 101 under the force of the spring 105. Upon rotation of the cam ring 104, the set bar 113 causes the intermediate ring 10 to rotate so that the cam member 12 is moved upwardly or downwardly depending upon the direction of rotation of the ring 10. Therefore the intermediate lever 15, which is in engagement with the cam portion 12a of the cam member 12, is caused to pivot so that the matching pointer 16 has its indicating portion $16_2$ pivot until it aligns with the pointer $18_1$. This alignment of the indicating portion $16_2$ with the pointer $18_1$ means that the cam ring 104 has been rotated through the required angle of rotation, and the position of the detecting pin 112 relative to the cam portion 104a is determined. Next when the shutter release button (not shown) is depressed, the mirror is rotated away from the path of the beam to the film, and in response to the upward movement of this reflecting mirror 2 the automatic aperture control lever 26 is rotated in the clockwise direction indicated by the arrow to engage with the aperture control lever 110 so that the aperture control ring 106 is caused to rotate in the counterclockwise direction against the spring 109. As a consequence, the aperture blades 107 are closed from the maximum aperture to a preset aperture. In this case, the angle of rotation of the aperture control ring 106 is controlled by the position of the rocker 111 which in turn is determined depending upon the position of its detecting pin 112 in engagement with the cam portion 104a of the cam ring 104. Thus the aperture blades 107 are closed to the aperture which has been preset by the preset ring 101. When the reflecting mirror 2 is returned to its normal position after the optimum exposure has been made in the manner described above, the lever 26 is caused to rotate in the counterclockwise direction so that the aperture control ring 106 is rotated in the clockwise direction under the force of the spring 109 to its normal position at which the aperture blades 107 are again maintained at the maximum stop or full opened aperture.

II. Aperture Stop Photometry With the Lens System 1

Figure 7:
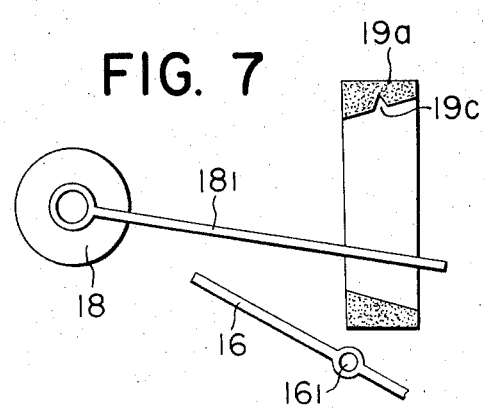
FIG. 7 is a view similar to FIG. 6, but illustrating the interchangeable lens system shown in FIG. 6 mounted on the camera body.

For stop aperture photometry, the one arm $20_1$ of the photometry lever 20 is pushed in the direction indicated by the arrow in FIG. 4 so that the sliding arm 21 is displaced in the direction indicated by the arrow. As a consequence, the lower end 15c of the lever 15 is moved upwardly by the cam surface 21b of the arm 21 so that the lower arm of the lever 15 is rotated in the counterclockwise direction indicated by the arrow through a greater angle than that traversed by lever 20 about pin $20_2$. As a result, the matching pointer 16 is displaced away from the scale 19 as clearly shown in FIG. 7. It is seen that the required angular displacement of lever 15 relative to the angle of rotation of the lever 20 is suitably adjusted by the slope of cam surface 21b of the sliding arm 21. After the projection 106a of the aperture control ring 106 has made engagement with the upper bent portion 111b of the rocker 111, the rotation of the automatic aperture setting lever 26 is not permitted any longer. Therefore when the slide arm 21 is displaced in the direction indicated by the arrow in FIG. 4, the spring 25 loaded between the arm 21 and the retarding member 24 is extended, but the member 24 remains in the same position because its depending projection 24a remains in engagement with the arm of the automatic aperture setting lever 26.

When the cam ring 104 is rotated by the preset ring 101, the rocker 111 which is operatively coupled to the cam ring 101 through the pin 112 is rotated so that the aperture control ring 106 may follow this rotation under the force of the bias spring 25 of the rtarding member 24 and the spring 109, thereby closing the aperture blades 107. Therefore, the zero method photometry is accomplished with the marking 19c at the mask 19a on the scale 19 being as a reference point (See FIG. 7). In this case, the bar 113 actuates the intermediate ring 10 as in the case of I described hereinbefore, but since the matching pointer 16 has been displaced away from the effective range of the scale 19, as described above, by the lever 15 which engages with the cam surface 21b of the slide arm 21, the intermediate ring makes merely an idle rotation and does not displace the matching pointer 16 through the cam member 12.

Thus the open aperture and aperture stop photometries can be accomplished with the use of the lens system 1, and in case of the open aperture photometry, the pointer matching system is utilized, while in the aperture stop photometry, the zero method is utilized so that there will no confusion in operation.

III. Aperture Stop Photometry With the Lens System 1' For Aperture Stop Photometry It is shown in FIG. 6 when the lens system for aperture stop photometry 1' is mounted on the camera body 2. In the lens system 11 for aperture stop photometry, as distinguished from the lens system 1 for open aperture photometry, there exists no set bar 113 movable in response to movement of the preset ring 101. Therefore the ring 10 is rotated in the clockwise direction, viewed from the left end of the drawing, by the spring 11 due to the absence of the set bar 113. In this connection, the cam member 12 is slid upwardly and the intermediate lever 15 is pivoted in the clockwise direction around the pin 15b by means of the spring 17 becasue the pin 15a carried by the intermediate lever 15 is in forced engagement with the cam surface 12a of the cam member 12. As a result, the matching pointer 16 is displaced beyond the working range of the pointer $18_1$ of the exposure meter 18, i.e., at the right end portion of the scale 19 in FIG. 4. Simultaneously, the automatic aperture setting lever 26, which is in engagement with the depending projection 24a of the retarding member 24, causes the aperture control ring 206 to rotate through the bar 210, thereby closing the aperture blades 207 to a desired stop value from the maximum stop or fully opened aperture. The angle of rotation of the aperture control ring 206 is dependent upon the position of the pin 212 relative to the cam portion 204a with which it engages. As the aperture blades 207 are closed to the desired stop, the light passing through the lens system 1' is limited so that the electrical output of the photoelectric effect element 6 (See FIG. 1) is varied. Therefore, the pointer $18_1$ of the exposure meter 18 swings through an angle accordingly. In this case, the preset ring 201 is adjusted so that the pointer $18_1$ may coincide with the marking 19c, which may be viewed in the field of view of the viewfinder. Therefore, when the pointer $18_1$ coincides with the marking 19c, a stop thus far arranged by the preset ring 201 gives the optimum stop.

Figure 9:
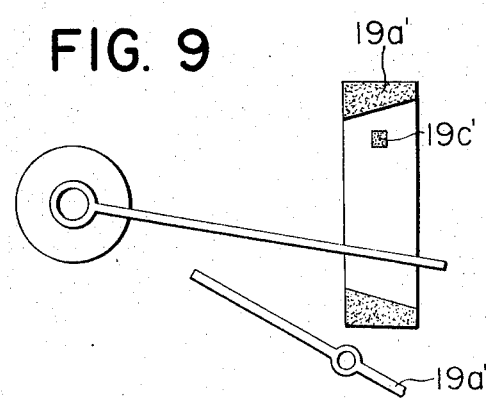
FIG. 9 is a view similar to FIGS. 5 and 7, but illustrating another embodiment of a fixed-position mark.

In the instant embodiments described hereinabove, the notch of the mask portion 19a of the scale 19 is used as a marking 19c, but it is seen that a fixed point mark 19c' which may be viewed in the field of view of the viewfinder may be also used as shown in FIG. 9.

Figure 8:
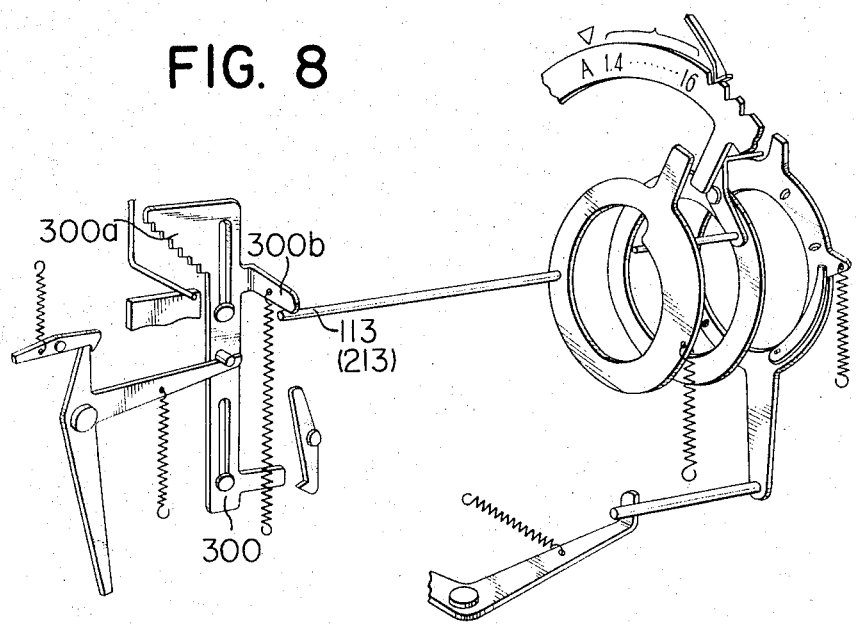
FIG. 8 is a view illustrating one example of the prior art automatic aperture setting device which may be incorporated in the exposure determination device in accordance with the present invention.

When the lens system 1 for open aperture photometry with the automatic exposure setting mark A (See FIG. 4) is to be mounted on the camera body 2, there is provided, as shown in FIG. 8, a pointer detecting member 300 having a stepped portion 300a and a projection 300b which engages with the set bar 113 or 213 so that the angle of rotation of the cam ring 106 or 106 may be determined through the bar 113 or 213 depending upon the angular deflection of the pointer of the exposure meter. Sinc e this mechanism is well known in the art, and does not constitute the present invention, no detailed description will be made.

As described above, according to the present invention, in the camera body are disposed and arranged the automatic aperture control bar 110 or 210 and the bar 113 for presetting an aperture, both of which are operatively interlocked with the photometry lever 20 and the pointer matching mechanism, so that the matching pointer 16 in the camera body may be actuated by rotating the preset ring 101 on the side of the lens system for open aperture photometry, and aperture stop photometry of the zero method may be accomplished by operating the photometry lever on the side of the camera body to displace the matching pointer 16 away from the scale, energizing the aperture control ring 106 or 206 in the lens system and rotating the cam ring 104 or 204 by the preset ring 101 or 201. Therefore it is seen that both of the interchangeable lenses for open and aperture stop photometry respectively may be used in the TTL photometer of the type described. Since the open aperture photometry technique is accomplished by the pointer alignment method while the aperture stop photometry is accomplished by the zero method, the erratic operations may be prevented, thus enabling one to obtain the photometry with a desired degree of accuracy.

I claim:

1. A single lens reflex system capable selectively of open aperture photometry and aperture stop photometry comprising:
   a. means for varying the aperture setting of said lens system;
   b. means for controlling a selected preset aperture opening for said aperture varying means;
   c. means for metering the light from the object, including a pointer and photoelectric means for deflecting said pointer in proportion to the quantity of said light;
   d. matching indicator means for open aperture photometry comprising a first matching member movable for alignment with said pointer;
   e. means for coupling said first matching member to said means for controlling a selected preset aperture opening, so as to move said first matching member in response to movement of said means for controlling;
   f. matching indicator means for aperture stop photometry comprising a second matching member stationarily disposed within the deflection range of said pointer;
   g. means including an operating member for actuating said aperture varying means to said selected preset aperture opening; and
   h. means for displacing said first matching member beyond the deflection range of said pointer for aperture stop photometry, said means for displacing being coupled to said operating member;
   whereby exposure may be properly determined by a technique selected from open aperture and aperture stop photometry, selectively as desired, by aligning said pointer and one of said first and second matching means respectively.

2. A single lens reflex system as set forth in claim 1, wherein said matching indicator means for open aperture photometry further comprises;
   a. a first cam member slidably mounted with respect to said system and having a cam portion;
   b. an intermediate lever member pivotally mounted with respect to said system in proximity to said first matching member; and
   c. means for causing said lever member to follow said cam portion in response to the sliding of said first cam member so as to move said first matching member into alignment with said pointer.

3. A single lens reflex system as set forth in claim 2 wherein said means for displacing said first matching member comprises:
   a. a slide member having a cam surface at one end thereof, said slide member being mounted so that said cam surface is engagable with a portion of said intermediate lever; and
   b. means for sliding said slide member so as to cause said cam surface to engage with said portion of the intermediate lever;
   whereby said intermediate lever is pivoted into engagement with said first matching member, causing said first matching member to be displaced beyond the deflection range of said pointer.

4. A single lens reflex system as set forth in claim 3 further including:
   a. a spring loaded retarding member slidably mounted on said slide member; and
   b. means mounted on said retarding member for engaging said operating member, so that said retarding member causes said operating member to actuate said aperture varying means during aperture stop photometry.

5. A single lens reflex system as set forth in claim 1 further including means for causing said operating member to actuate said aperture varying means in response to shutter release for open photometry.

6. A single lens reflex system as set forth in claim 2 wherein said means for coupling said first matching means comprises:
   a. a ring having a projection thereon for engagement with said means for controlling a selected preset aperture opening;
   b. said ring being mounted concentrically with respect to the optical axis of said lens system and rotatable with respect thereto;
   c. biasing means tending to cause said ring to return said first matching member to its initial position; and
   d. means mounted on said ring for coupling said ring to said first cam member;
   so that said first matching member may be moved into alignment with said pointer by said means for controlling a selected preset aperture opening.

7. A single lens reflex system as set forth in claim 1 wherein said second matching member comprises a marking stationarily disposed within the deflection range of said pointer.

* * * * *